May 3, 1966           L. D. BARRY           3,249,063
COUPLING BETWEEN VEHICLES
Original Filed March 25, 1960           5 Sheets-Sheet 1
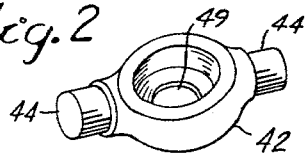
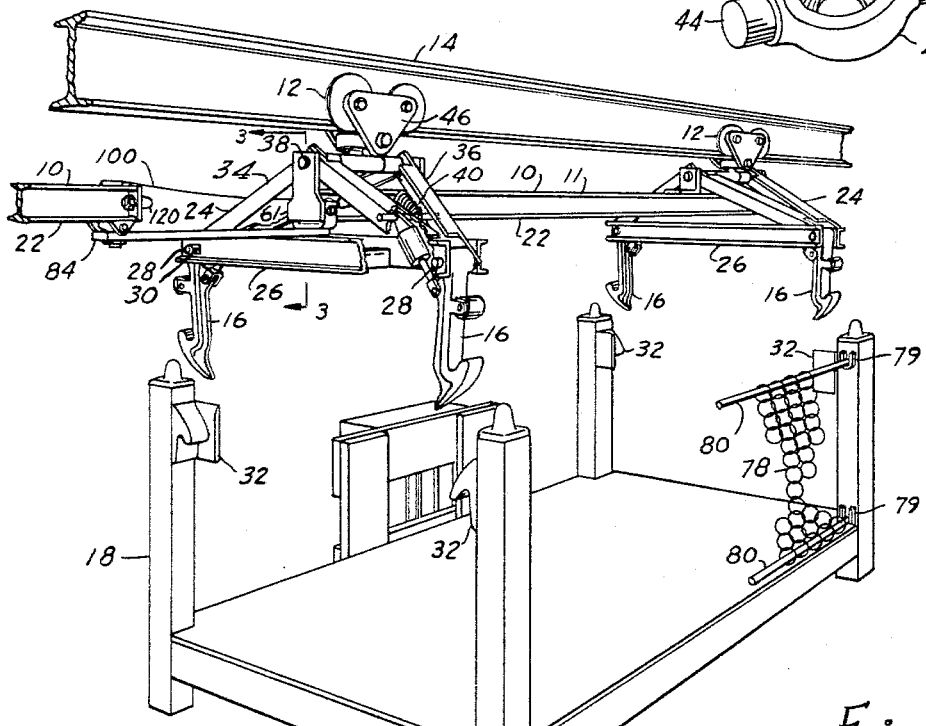
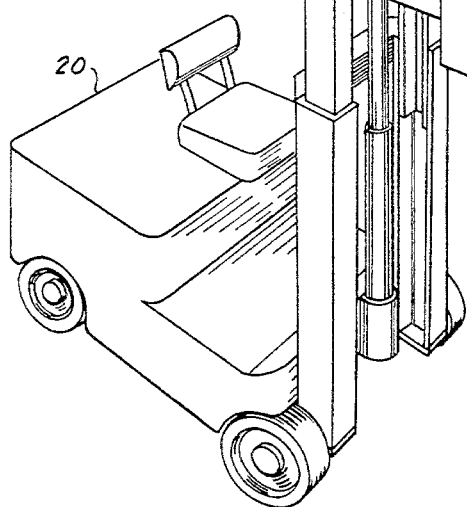
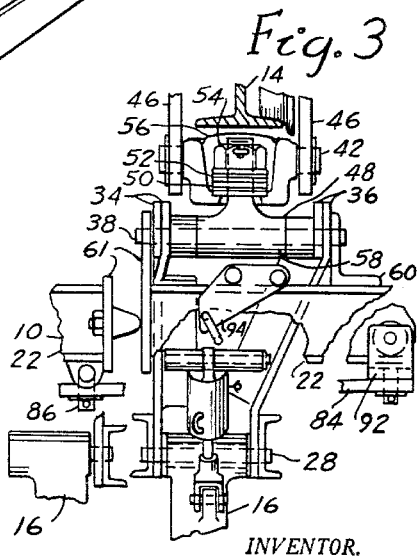
INVENTOR.
Leonard D. Barry

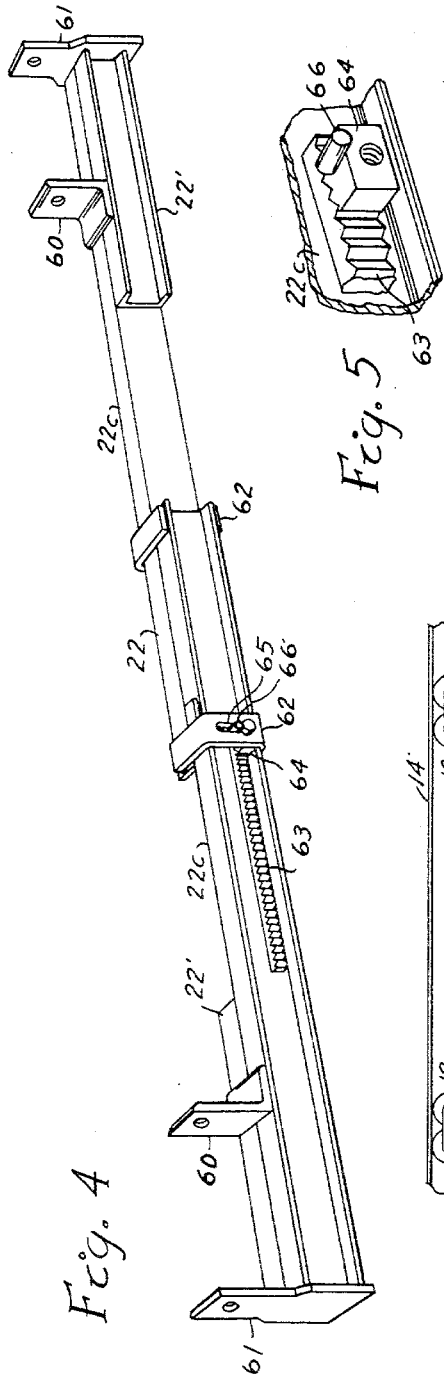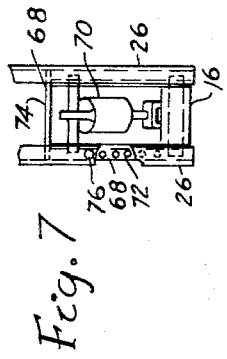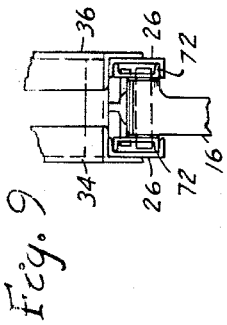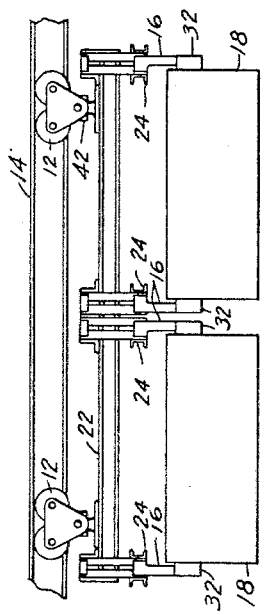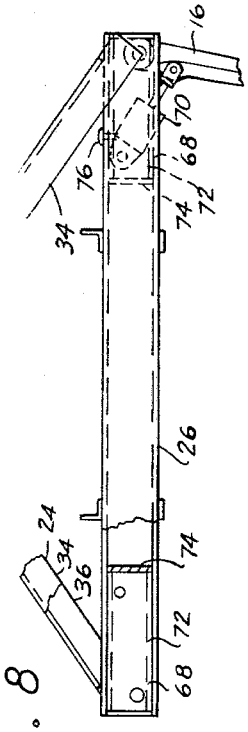

May 3, 1966  L. D. BARRY  3,249,063
COUPLING BETWEEN VEHICLES
Original Filed March 25, 1960   5 Sheets-Sheet 3
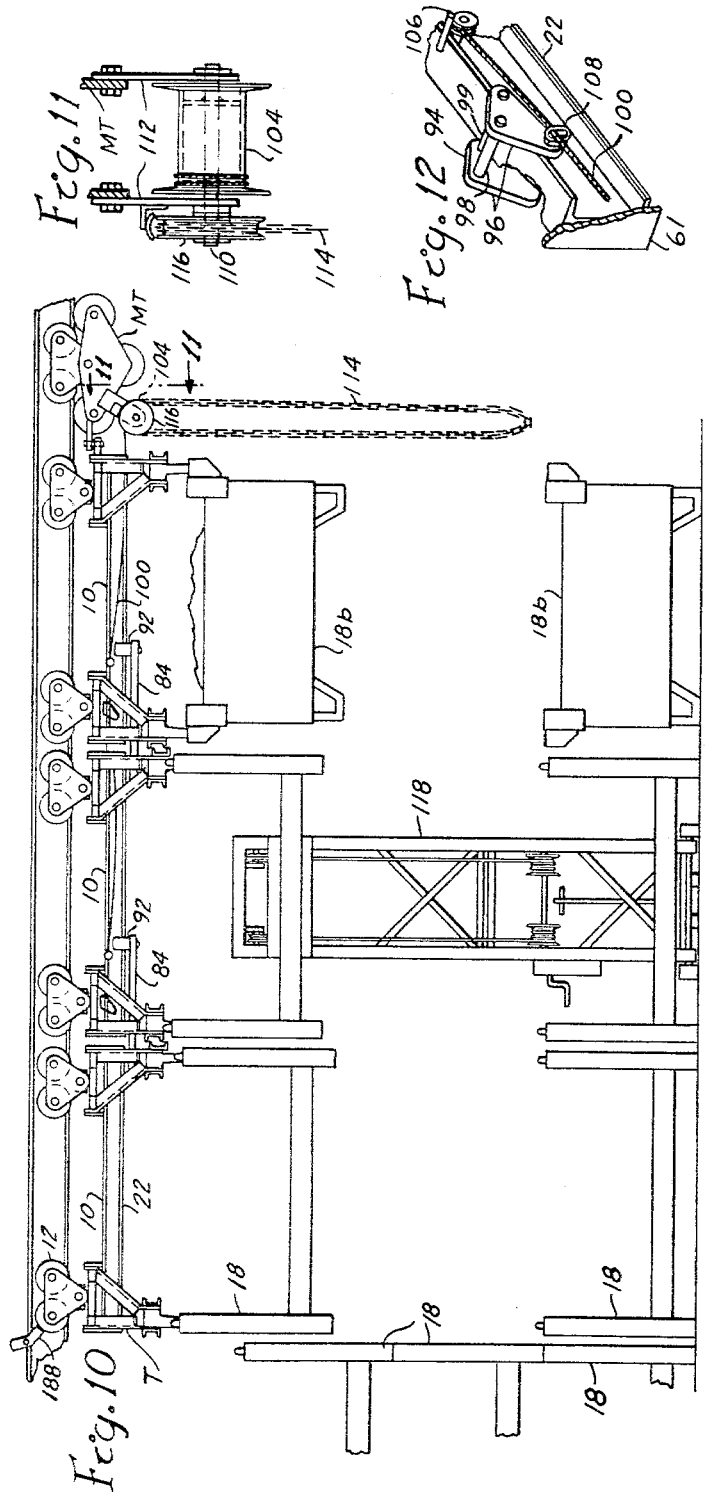
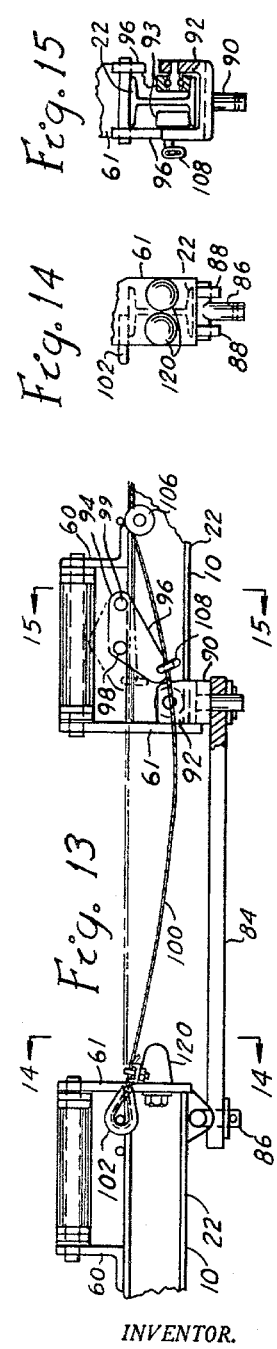
INVENTOR.
Leonard D. Barry May 3, 1966  L. D. BARRY  3,249,063
COUPLING BETWEEN VEHICLES
Original Filed March 25, 1960  5 Sheets-Sheet 4
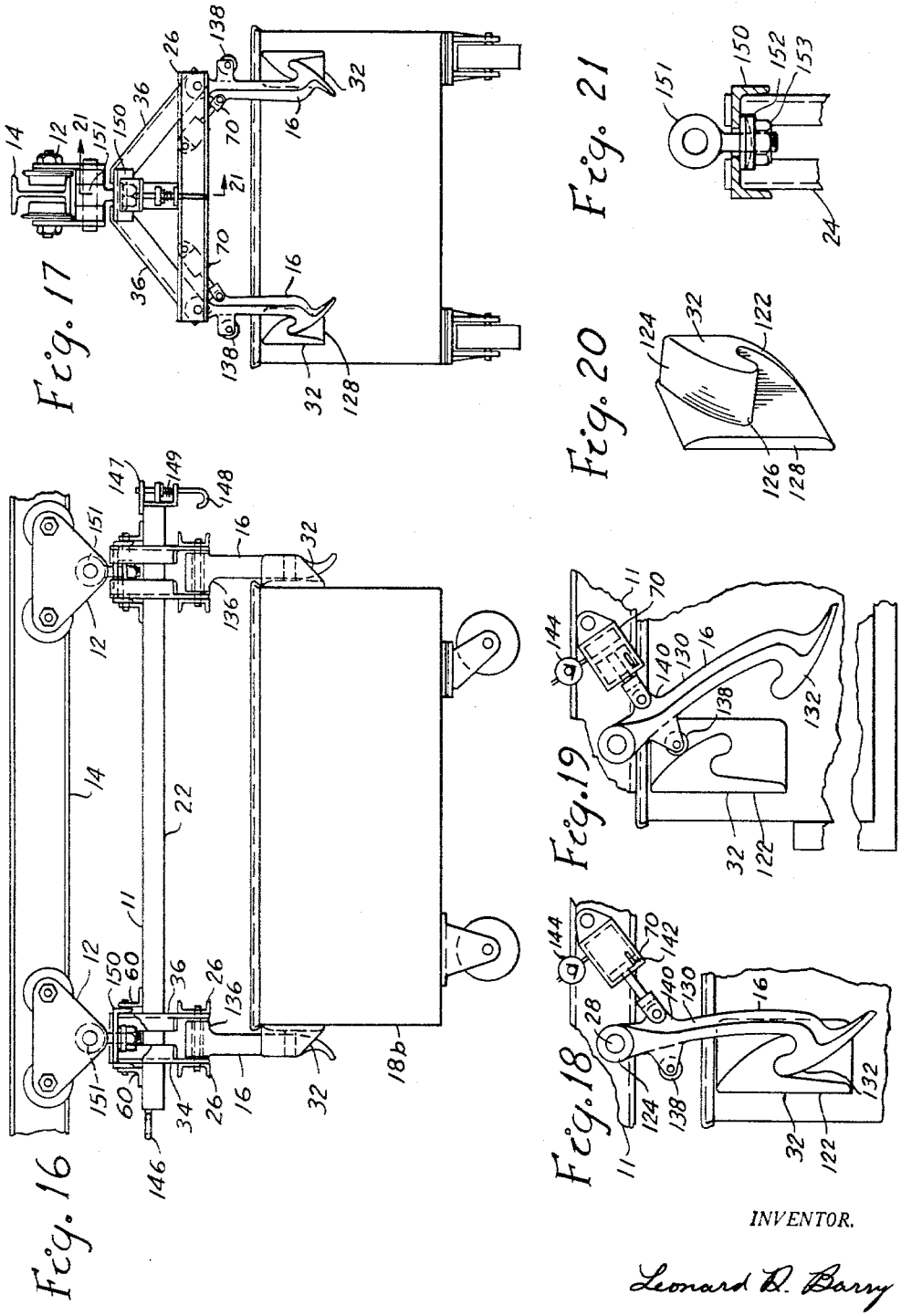
INVENTOR.
Leonard D. Barry May 3, 1966 L. D. BARRY 3,249,063
COUPLING BETWEEN VEHICLES
Original Filed March 25, 1960 5 Sheets-Sheet 5
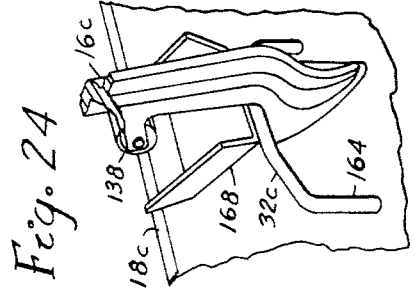
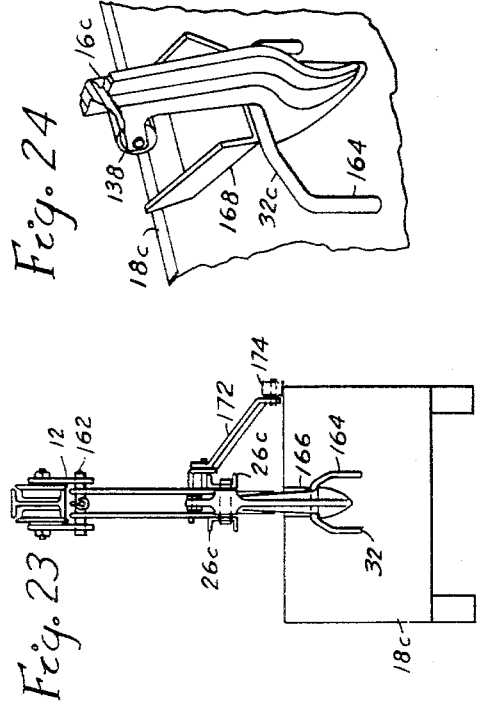
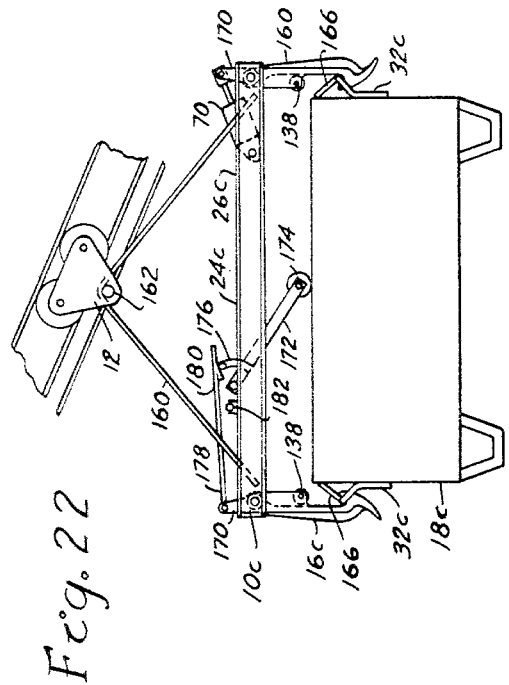
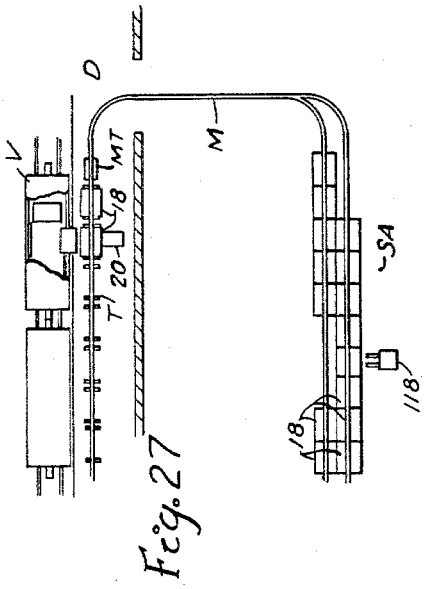
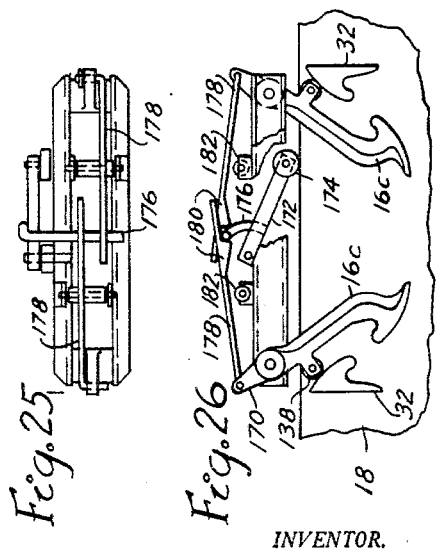
INVENTOR.
Leonard D. Barry

United States Patent Office 3,249,063
Patented May 3, 1966

3,249,063
COUPLING BETWEEN VEHICLES
Leonard D. Barry, 19300 Pennington Drive,
Detroit, Mich.
Original application Mar. 25, 1960, Ser. No. 17,658, now Patent No. 3,154,203, dated Oct. 27, 1964. Divided and this application Oct. 26, 1964, Ser. No. 406,606
6 Claims. (Cl. 104—93)

This invention relates to vehicle coupling and more particular to couplers on vehicles for handling, transporting and storing of containers such as skid and gondola boxes, racks, and special containers.

This is a division of my application filed March 25, 1960, Serial No. 17,658, now Patent No. 3,154,203, this being a simplification applicable to industry and warehousing or material handling generally.

An object of this invention is to provide an improved means for handling and storing racks, skid boxes, gondolas, shipping containers, etc. on overhead carriers. It is a further object to provide simple and inexpensive monorail carriers having means for engaging and holding containers when lifted thereto by a fork truck, portable stacker, or other elevating device preferably without requiring horizontal movement of the load.

Fork trucks are frequently used to unload railway cars and trucks taking their loads considerable distances to deposit them in warehouses or work areas. It is an object of this invention to provide a material handling system in which the fork truck and its operator is better utilized.

In present overhead monorail carrier systems for transferring containers a hoist is provided on the carrier for picking up the container. The operator who rides with the carrier and operates the hoist to stack and remove containers must look almost directly down on them, limiting the number of container carriers that can be loaded by the operator from the monorail cab. Automatic dispatching systems are available for monorail which eliminates the necessity of the operator riding in the cab unless needed there to operate the hoist. It is therefore an object to provide a material handling system which combines the fork lift truck for loading and unloading with a train of inexpensive monorail carriers for transfer, resulting in faster and less expensive handling of transfer containers than present methods.

It is an object to provide container carrying monorail trains for loading and unloading with a fork truck rather than have a hoist on each carrier. A train of these containers above a loading dock can be loaded by a fork truck unloading a string of freight cars, trucks, or other vehicles at the loading dock for example, thus reducing the distance that the fork truck is operated to deposit its load and thus maintaining clear dock area by suspending the load on the monorail without first depositing it on the dock.

Some other and further objects are to provide means whereby the containers can be loaded onto and unloaded from the carriers from the side of the monorail (fork truck at right angles to the monorail), which is most convenient for the fork truck operator and permits the containers to be stacked in a row directly under the monorail train, to provide a carrier which is inexpensive enough to go into storage with the load and which can be pulled by a monorail tractor which can be dispatched by available means without requiring the operator to ride with the train, to provide a carrier which can be adjusted easily to handle containers of various sizes and types, to provide a carrier train which conserves space, and to provide carriers having collapsible couplings to extend for train operation and to bunch the carriers together for storage and for bringing the containers close together for stacking in or removal from a row directly under the monorail by means such as a fork truck or inexpensive portable stacker without requiring horizontal movement of the container lengthwise the monorail.

Other and further objects will be pointed out hereinafter or should be apparent from consideration of this invention as described with reference to the accompanying drawings wherein:

FIGURE 1 is a perspective view of a carrier in a monorail carrier train to which a fork truck is lifting a rack.

FIGURE 2 is a perspective view of a swivel nest.

FIGURE 3 is a broken sectional view on line 3—3 of FIGURE 1.

FIGURE 4 is a perspective view of an adjustable sill of a carrier.

FIGURE 5 is an enlarged perspective view of the lock arrangement for the sill shown in FIGURE 4.

FIGURE 6 is a side elevation of a carrier for two containers.

FIGURES 7, 8, and 9 are respectively partial top, side, and end views of an adjustable hook yoke.

FIGURE 10 is a side elevation of a row of racks and skid boxes in storage with a train of the monorail carriers aligned directly above and a portable stacker for lowering and lifting the containers between the carriers and the row, illustrating how little space is lost between containers.

FIGURE 11 is a view taken on line 11—11 of FIGURE 10.

FIGURE 12 is an oblique top view of an end portion of a carriers sill, showing the coupling latch.

FIGURE 13 is a side elevation of the preferred coupling and portions of the end of the sills on coupled carriers.

FIGURE 14 is a view taken on line 14—14 of FIGURE 13 with coupling omitted and a portion of the yoke.

FIGURE 15 is a section taken on line 15—15 of FIGURE 13 with coupling omitted and a portion of the yoke and wheel cut away.

FIGURES 16 and 17 are respectively the side and end elevations of a variation of the carrier holding a gondola.

FIGURES 18 and 19 are views of the hooks in respectively closed and open positions to show how the hooks on the containers operate the hooks on the carriers.

FIGURE 20 is a perspective view of the preferred hook for the rack, box, or tank type of container.

FIGURE 21 is a partial section taken on line 21—21 of FIGURE 17.

FIGURES 22 and 23 are respectively side and end elevations of a variation of the carrier and container.

FIGURE 24 is a perspective view of a portion of the end of the container and supporting hook shown in FIGURE 23.

FIGURES 25 and 26 are respectively top and side views of a variation of the hook operating mechanism shown in open position with a portion cut away for clarity.

FIGURE 27 is a plan view of a typical installation at a warehouse or industry.

Referring to the drawings and in particular to FIGURE 1, container carrier 10 has an overhead frame 11 secured to trucks or trolleys 12 on track 14. Track 14 is preferably a monorail track, but rope ways or crane type ways can be used in applications of this invention without departing from the intended scope thereof. Automatic latching and unlatching hooks 16 are pivotally secured to frame 11 for engaging and holding the container or rack 18 when lifted thereto by the elevating device here shown as fork lift truck 20.

Frame 11 preferably comprises a longitudinal sill 22 in the form of an I-beam and two hook yokes 24 each transverse to the sill at opposite ends thereof. Each yoke 24 supports two swinging hooks 16, one on each end. Each yoke has two bars, channels 26, between which hooks 16 are each pivotally mounted preferably with a sleeve bearing to swing on pin 28, FIGURE 3, which is positioned horizontal and parallel to the sill and secured from turning and endwise movement to a channel 26 by usual means such as tab 30 screwed to the channel and extending into a slot in the pin.

The corner posts of rack 18 each have a catch or hook 32 for engaging a hook 16 as the container is lifted. Hooks 16 are spaced in frame 11 to align with hooks 32. Hooks 16 are preferably arranged to swing back toward the frame to that hooks 32 can be mounted facing each other on the sides of the posts facing the frame where they do not increase the overall dimensions of the rack and do not interfere with the side loading of the rack. By having hooks 16 swing inward rather than endward the hooks can be opened even with racks abutting end to end.

Though hook yokes 24 can be integral or secured fast to sill 22 it is preferred to pivotally secure them to the sill at their midpoints to permit the yoke to rock in a plane transverse to the sill so that each hook will take a share of the load according to the distribution of the load in the container and so that both hooks on the yoke will operate substantially together even with considerable vertical variation in the location of hooks 32 as would occur, for example when the fork truck tilts the container back in the forks as it lifts it to the hooks.

The hook yokes are preferably of open triangular or trussed construction for strength and light weight. Accordingly ties or angles 34 and 36 are run from channels 26 on respectively the inner and outer sides of the hook yoke upto a pivot pin 38 above sill 22. The outer ties 34 of each yoke run in a plane transverse to the carrier while the inner ties 36 preferably diverge from the outer tie on the same side of the yoke as they run up to the vertex at pin 38, see FIGURE 3. The two inner truss angles are connected to the two outer angles at the vertex by pin 38 to make a rigid frame which can take end thrust from the container. If desired to reduce side sway, springs 40 can connect each side of the yoke to the sill.

Trolleys 12 can be secured either to the sill in a usual manner, FIGURE 6, or to the hook yoke. One arrangement for securing trolleys 12 to the yoke is shown in FIGURE 2, has integral trunnions 44 for mounting between the side plates 46 of trolley 12. An eye bolt 48 about pin 38 has its threaded rod extending up through a clearance hole 49 in the bearing nest. A spherical washer 50 and preferably a thrust washer 52 are inserted in succession into the nest over the rod of the eye bolt 48, and then a slotted nut 54 is screwed on and secured by a pin. A sheet metal cover 56, FIGURE 3, snaps on over the pocket in the nest to keep dirt and water out. The eye of bolt 48, which serves as a spacer between angles 34 and 36, has a sleeve bearing 58 in which the hook frame swings. The ends of pin 38 extend through holes in either clip angles 60 or flats 61 to support the sill. Yokes 24 can be mounted anywhere along the sill on clips 60 according to the length of the container to be carried.

If the containers to be handled are of various lengths the clips can be adjustably secured to the flanges of the I-beam sill 22 as by bolts, or the sill can be made adjustable in length as shown in FIGURE 4, which shows the sill 22 composed of two channels 22c turned back to back with a U-shaped bracket 62 secured to the end of each to gird the other so that the channels can be telescoped. A length of channel 22' is added to each end to form the I-beam section at the ends which are otherwise similar to the yoke shown in FIGURE 1. The two channels are locked in place by any suitable means such as a toothed rack 63 secured along the bottom of the trough of one channel 22c and a dog 64 having teeth engaging the rack, the dog being secured to slide up and down on the bracket 62 secured to the other channel 22c. Dog 64 is secured by a bolt through slot 65 in the bracket to engage or disengage the rack and is preferably guided by pin 66 to keep if from turning.

More than one container can be carried on a carrier by providing a sill beam of sufficient length and adding the required number of hook yokes as shown in FIGURE 6.

The hook yokes can be adjustable for handling containers which have hooks spaced at various widths apart. This adjustment is provided preferably with the rigid yoke frame retained as shown in FIGURES 7, 8, and 9 wherein channels 26 are turned to face each other to support two rides 68 each of which support a hook 16 and a hook closing delay 70 to be described later herein. The riders are shown as two short channels 72 turned legs out and spaced by member 74 to slide between the troughs of channels 26. Hook 16 is supported between channels 72 of the rider similarly as between channels 26, FIGURE 3. A headed pin 76 is dropped in a hole in the top of channel 72 to secure the hook in the desired horizontal position. The riders can be slid out the end of the yoke and turned end for end to hook hooks facing out.

Racks used for handling packages such as found in food warehouses are preferably provided with removable chain or link mail slides 78, FIGURE 1, to keep the packages from falling off, U-pockets at the tops and bottoms of the facing sides of the side posts support rods 80 on which the chain mail 78 is linked and secured.

The containers on a train of carriers must be spaced apart to turn corners, but where carriers are stored loaded or empty of where containers are stacked it is desirable to space the containers next to each other to save space. Accordingly as a feature of this invention and with reference to FIGURES 1, 3, and 10–15 the end hook frames are placed on the ends of sill 22 with flats 61 extending down to cover the end of the I-beam sill 22 and extending outward from the flanges of the beam. Adjacent carriers 10, see FIGURES 1, 3, 10, and 13, are connected by coupler bar 84 having a vertical hole in each end. One end of coupling bar 84 is secured to swivel on T bolt 86 swivel mounted between blocks 88 secured to the under side of the left hand end of the sill. The other end of bar 84 is pivotally secured to the bottom of the U-shaped bracket 90 of trolley 92 which has at least one wheel 93 or other support means for riding each lower flange of the sill beam 22 of the next carrier to the the right. End plate 61 serves as a stop against which U-shaped bracket 90 bumps to keep trolley 92 from running off the end of the sill. A coupling latch 94 (see FIGURES 12 and 13) has two triangular side plates 96 connected by a shoulder rivet 98 to space the plates 96 to straddle I-beam 22 and is pivotally secured to the I-beam by pin 99 welded transversely across the top of beam 22 to position the latch to drop behind trolley 92 when at the left hand end of sill 22 to lock the coupling for operation of the carrier train T, FIGURE 10.

When the carriers are to be bunched at the end of their run, the coupling latches 94 are lifted by rope 100 anchored at 102 to the sill of the last carrier in the train and to drum 104 located either on the monorail tractor MT as shown in FIGURE 10 or on the first carrier if the tractor is used for other service. Rope 100 is run over sheaves 106 which support it along the intermediate carriers of the train and through the eye of a link 108 welded on the swinging end of each coupling latch 94 for opening the latches between carriers. Drum 104 is welded on shaft 110 bearing mounted through plates 112 to the tractor or first carrier and turned by hand chain loop 114 draped over sprocket 116 which is keyed to shaft 110. When chain 114 is pulled clockwise, FIGURE 10, reeling the rope 100 onto drum 104, latches 94 are lifted and the carriers are pulled into each other or bunched to form a string of carriers as shown in FIGURE 10. The racks 18 and boxes 18b can then be stacked in a substantially solid row without further horizontal movement lengthwise the carrier. They can be tiered as shown at the left of FIGURE 10 by a fork lift truck or by the inexpensive portable stacker 118 which is shown removing a rack from a carrier.

Rubber bumpers 120, FIGURES 1, 3, 13, and 14 are provided to reduce the impact when the carriers are pulled together. It should be evident that the containers can be spaced against each other by slight modification if desired, but leaving a space between the containers prevents scraping and catching during the lifting and lowering operations.

When the tension on chain 114 is released latches 94 drop by gravity, but the carriers on substantially level track remain bunched. The carrier train is opened out and recoupled for operation by running the tractor MT, FIGURE 10, to the right. This pulls the left hand end of sill 22 of the first carrier to the trolley 92 secured to the coupling bar 84 of the next carrier, etc. The trolleys 92 in passing to the left of latches 94 lift and latch them as the rope unreels from drum 104.

Referring to FIGURES 16–20, hooks 32 have a back plate 122 for strength and for mounting to a rack post, a top face 124 curved back and up from the face of the hook's tooth 126 for engaging and opening hooks 16, and a side plate 128 for keying racks 18 for engaging and opening hooks 16, and a side plate 128 for keying racks 18 from slipping off hooks 16 or for mounting to a box, FIGURE 17. The side plate 128 extends beyond the front of tooth 126 to guide upper hooks 16 past the tooth to engage thereunder. The side plate can be omitted where the hook is secured to the side of a box or structural member. With the side plate 128 made integral the hooks are cast or forged right and left hand.

Referring to FIGURES 16–19, hooks 16 have a long neck 130 which depends from the frame of the carrier to an up and transversely outward turned tooth 132 which has a backward and downward sweeping front face for engaging with hooks 32. The side of hook 16 which engages with hook 32 or the container sweeps endward from the container to longitudinally align the container for coupling. With hooks 16 turned outward to engage with hooks 32 turned inward (facing each other) no space between racks and a minimum of space between boxes is required for hooks and for the swinging of hooks. The head 124 of hook 16, through which pin 28 runs, is long in the direction of the hole to take endwise torque resulting from acceleration and deceleration of the container. This design prevents endwise bumping of the containers into each other even when closely spaced on the hooks. The neck 130 of hook 16 extends from the head away from the side next to the container forming a chin 136 which offsets the hook to permit closer spacing of the containers.

A protrusion or preferably a wheel or roller 138 on the front of the neck of hook 16 is spaced to engage the top face of hook 32 to open hook 16 when the container is lifted by the fork truck a distance above hook engaging position. The hook 16 is then held open by a delayed return device 70 which is shown in FIGURES 18 and 19 as a special dashpot pivotally mounted between yoke 24 and lug 140 on the back of hook 16. Dashpot 70 has free travel during the first portion of its stroke to engage hooks quickly but delays the return of the hook when opened until the lift operator can lower the container below the hooks. A passage such as groove 142 on the inner face of and lengthwise the cylinder of dashpot 70 near the rod end thereof allows air to pass freely between the head and rod ends during the first portion of the stroke of the dashpot. A check valve 144 connected to the head end of the dashpot exhausts air as the dashpot is compressed but closes to hold the hook lifted until air is bled in past the plunger or through an orifice in the cylinder. Gravity or a spring is relied on to return hook 16. The spring can be a compression spring in the head end of the cylinder of the dashpot. Only vertical movement of the lift is required to hook or remove the container. The fork truck can therefore load and unload my carrier from any angle.

Where telescoping of the coupling is not desired, any suitable coupling can be provided on the ends of sill 22, which is shown as a square tubing in FIGURES 16 and 17 with a horizontal hook eye 146 secured to one end and a three-eye clevis 147 vertically secured to the other end, the pin of the clevis having a hook 148 at its bottom for pulling it down to open it and a compression spring 149 on and connected to the pin and resting on top of the lower eye of the clevis to close the pin.

Instead of running angles 34 and 36 up to a pin 38 at the vertex of the hook frame they can be connected by a flat piece or (as shown in FIGURES 16, 17 and 21) by channel 150 which spaces and supports angles 34 and 36 at the vertex. The trolley 12 is connected to this hook yoke by eyebolt 151 whose eye is pinned between the side plates of the trolley at the top of the yoke, a spherical washer 152, and a nut 153 threaded on the eye bolt to support the yoke. The legs of channel 150 run transverse to sill 22, extend down, and are pivotally connected to the sill on an axis parallel thereto by clip angles 60.

Where the loaded carrier must travel a steep grade the carrier can be supported on a single trolley at the middle of beam 22, or, as shown in FIGURES 22 and 23, the hook yoke can span the container to hook opposite ends. This carrier 10c has a yoke 24c comprising two channels 26c spaced apart between which hooks 16c are pivoted. Each channel 26c has the ends of a bent tie rod 160 welded thereto. The rods 160, which replace angles 34 and 36 for light construction, run up and over the load pin 162 of trolley 12 and are spaced apart and welded to pin 162 which turns on the side plates of trolley 12.

The container 18c has two hooks 32c symmetrical on the center line of each end near the top. Hooks 32c are fabricated of round rod 164 to form an inverted U flairing out from the end of the container along the top, as shown in FIGURES 22–23, to hook over the sides of hooks 16c to prevent the container from slipping sidewise off hooks 16c. Hooks 32c taper toward the top to guide hooks 16c into engagement therewith. Hooks 32c have a bar or flat 166 sloping down from the end of the container to the top of rod 164 so that rollers 138 engage this flat to open hooks 16c when the container is lifted up from the carrier.

Instead of flat 166 a formed channel or chute 168, as shown in FIGURE 24, can guide hooks 16c into engagement. The tail of hook 16c comes to a point in the middle to increase the coupling range when used with chute 168.

So that the container can be removed conveniently from hooks 16c closing delay again can be provided by dashpot 70 now pivotally secured between channels 26c and arm 170 integral with and extending up from hook 16c as shown on the right hand side of FIGURE 22, or a mechanical type delay can be provided such as that shown on the left side of FIGURE 22 wherein lever 172 carrying wheel 174 engages the top of the container 18c before it is lifted high enough to engage hooks 16c and 32c. Lever 172 has a finger 176 which extends out under a latch bar 178 pivotally secured to lever 170 on hook 16c in place of the dashpot 70. Latch bar 178 has a catch 180 which latches over finger 176 only when hook 16c is opened. i.e. when plate 166 pushes roller 138 out, swinging hook 16c up and pushing latch bar 178 to the right far enough to catch over finger 176. When bar 178 latches over finger 176 the container can be lowered with hook 16c remaining lifted until after bar 178 hits stop 182 and lever 172 drops finger 176 out from catch 180 when the container is below the hooking points of hooks 16c and 32. Hook 16c then swings to vertical position under the force of gravity ready to hook the next container.

This hook latching arrangement is shown in the hook yoke assembly, FIGURE 25 and 26, with like items given the same reference characters as in the other figures. In this assembly the hooks 16c face outward and engage hooks 32 which can be mounted to corner posts as in FIGURE 1 or to a side of a box or other container as in FIGURE 17 for example.

A typical application of the carrier is shown in FIGURE 27 wherein D represents a loading dock; V, a transportation vehicle such as a railway box car or a truck in which containers 18 are shipped; M, a monorail system having an overhead track parallel the dock on which a train of carriers T is spotted for loading and unloading; 20 the fork lift truck for unloading the transportation vehicle and for lifting the containers to engage the waiting carriers and for removing containers from the monorail and placing them aboard the transportation vehicle; MT the monorail tractor for pulling the train of carriers between the dock and warehouse or storage area SA which might be very remote from the dock and on a different elevation; 118 the portable stacker or fork truck which removes containers from the monorail and stacks them one above the other as shown in FIGURE 10 or lifts them to load the carrier train without necessity of horizontally moving them.

In operation the fork truck operator on the dock runs fork truck 20 inside box car V, picks up a container on the forks, backs out under monorail M, lifts the container engaging it on a waiting carrier, lowers the forks and drives under the carrier back into the car to pick up another container. In the meantime the carrier train is preferably indexed to align the next carrier adjacent the car door so when the fork truck operator backs out of car V the next empty carrier is waiting above for him to lift the container to it. Thus it should be evident that this system saves the fork truck operator from carrying each load into the warehouse, saves dock space as compared to a tractor trailer train, and enables the fork truck operator to transfer containers between the car and monorail with a minimum of turning and movement.

When the car is unloaded or the carrier full it is taken to the warehouse or storage area SA and bunched over a storage row where the portable stacker picks up the containers on the carriers and thereby opens their hooks and then lowers them to stack them directly thereunder to await call for the item stored; at which time the stacker is used to load the container back on the carrier for delivery to shipping, processing, or manufacture where similar or other facilities can handle the container.

Stop 188 on the monorail, FIGURE 10, can be set to align the carrier train at the stacking area. The stop is a dog pivotally secured to the upper flange of the monorail to swing down to engage a trolley 12. It can be worked by a pole or preferably by solenoid and maintains both raised and lowered positions by gravity. It is also useful in bunching a train of carriers with the aid of the tractor.

Having thus described a few of the many possible variations and applications of this invention it should be understood that all matter contained in the above description or shown in the accompanying drawings shall be interpreted as illustrative and not in a limiting sense.

I claim as my invention:

1. In combination a first and a second carrier, a coupler pivotally connecting the carriers to turn corners, one end of said coupler being pivotally secured to an end of the first said carrier and the other end of said coupler being pivotally connected to the second said carrier, said coupler being collapsible to run said carriers together, means for limiting the extension of said coupler, latch means for holding said coupler substantially extended and secured against collapse, and means for opening said latch means for bunching said carriers together, said coupler extending and latching extended when pulled.

2. A bunching coupling between carriers comprising in combination a track on the end of one carrier lengthwise thereof, a rider adapted to be supported on and move along said track, a stop for said rider at the end of said carrier, a latch for locking said rider substantially at said stop, a coupling bar for connecting carriers, said bar being pivotally secured at one end to said rider and at the other end to the end of the other carrier to permit said carriers to turn horizontally, and means for opening said latch so that said carriers can be bunched together to conserve space.

3. A coupling as in claim 2, said track being the sill of the carrier.

4. A coupling as in claim 3, said rider being a trolley on said sill.

5. A coupling as in claim 2 said latch being pivotally secured to swing vertically on the carrier to drop by gravity and lock the rider at the end of the carrier, and said means for opening being rope means secured to one carrier and under a portion of each said latch along the train of carriers to lift the latch when the rope is made taut, means for supporting said rope means along the train, and means for tensioning the rope to lift the latches and to bunch the carriers.

6. The combination of a coupling and vehicle comprising in combination, an end of a coupling, means on the end of said coupling adapted to move lengthwise on the frame of the vehicle, means for keeping said means from comming off the end of the frame, latch means for latching said coupling extended on the frame, and means for opening said latch to enable said coupling to be pushed in said vehicle to bunch vehicles for loading, unloading, and storage; said coupling extending and latching when pulled.

References Cited by the Examiner
UNITED STATES PATENTS

| 745,093 | 11/1903 | Carlisle et al. | 213—111 |
| 1,292,881 | 1/1919 | Rich | 213—111 |

FOREIGN PATENTS 465,153 9/1928 Germany.

ARTHUR L. LA POINT, *Primary Examiner.*

MILTON BUCHLER, *Examiner.*

F. W. MONAGHAN, *Assistant Examiner.*